US012639770B2

(12) United States Patent　　　　(10) Patent No.:　US 12,639,770 B2
Baughman et al.　　　　　　　　　　(45) Date of Patent:　　May 26, 2026

(54) METHOD TO CULTIVATE GREEN ENERGY PRACTICES AND PREDICT RISK FROM TERRACE-BASED AGRICULTURE

(71) Applicant: International Business Machines Corporation, Armonk, NY (US)

(72) Inventors: Aaron K. Baughman, Cary, NC (US); Jeremy R. Fox, Georgetown, TX (US); Tushar Agrawal, West Fargo, ND (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 278 days.

(21) Appl. No.: 18/350,915

(22) Filed: Jul. 12, 2023

(65) Prior Publication Data

US 2025/0022074 A1　　Jan. 16, 2025

(51) Int. Cl.
　　*G06Q 50/02*　　　(2024.01)
　　*G06Q 10/0631*　　(2023.01)
　　*G06Q 10/0639*　　(2023.01)
(52) U.S. Cl.
　　CPC ....... *G06Q 50/02* (2013.01); *G06Q 10/06315* (2013.01); *G06Q 10/06393* (2013.01)
(58) Field of Classification Search
　　None
　　See application file for complete search history.

(56) References Cited

U.S. PATENT DOCUMENTS 10,115,158 B2 * 10/2018 Lindores ............... A01B 79/005
10,201,121 B1 * 2/2019 Wilson ................. A01B 79/005

(Continued)

FOREIGN PATENT DOCUMENTS

CN　　104320057 A　　1/2015
CN　　104953935 A　　9/2015

(Continued)

OTHER PUBLICATIONS

Gagné, Lynda, and Norma Kerby. "Greater terrace agricultural area plan report." (2013). (Year: 2013).*

(Continued)

*Primary Examiner* — Brian M Epstein
*Assistant Examiner* — Derick J Holzmacher
(74) *Attorney, Agent, or Firm* — Amin, Turocy & Watson, LLP

(57) ABSTRACT

Systems, computer program products and/or computer-implemented methods described herein relate to balancing agriculture risk with green energy practices to reduce a carbon footprint. A system can comprise a memory that stores computer executable components and a processor that executes the computer executable components. The computer executable components comprise an analysis component that determines crop metrics and terrace metrics for a terrace slope farming system by employing imaging data, a prediction component that generates, based on the crop metrics and terrace metrics, a crop-terrace pairing for a terrace of the terrace slope farming system, wherein the crop-terrace pairing is defined by one or more of the crop metrics that match to one or more of the terrace metrics, and an evaluation component that identifies the crop-terrace pairing as resulting in a first carbon footprint that is lower than a second carbon footprint that is identified for the same terrace.

20 Claims, 10 Drawing Sheets

(56) References Cited

U.S. PATENT DOCUMENTS

| | | | | |
|---|---|---|---|---|
| 10,319,050 | B2 * | 6/2019 | Richt | G06Q 50/02 |
| 10,477,756 | B1 * | 11/2019 | Richt | G06Q 50/02 |
| 10,912,249 | B1 * | 2/2021 | Wilson | G05B 13/026 |
| 11,610,158 | B2 * | 3/2023 | Diamos | G06Q 10/06313 |
| 11,763,271 | B2 * | 9/2023 | Ashtekar | G06Q 10/30 705/308 |
| 11,775,906 | B2 * | 10/2023 | Ashtekar | A01B 69/001 705/7.36 |
| 11,861,625 | B2 * | 1/2024 | Ashtekar | G06V 20/188 |
| 2008/0229724 | A1 * | 9/2008 | Lynes | A01D 51/00 56/16.6 |
| 2010/0191998 | A1 * | 7/2010 | Moore | G06Q 10/06 713/340 |
| 2010/0306012 | A1 * | 12/2010 | Zyskowski | G06Q 10/0637 705/7.36 |
| 2013/0185104 | A1 * | 7/2013 | Klavins | G06Q 50/02 705/7.12 |
| 2013/0282423 | A1 * | 10/2013 | Hori | G06Q 50/02 705/7.25 |
| 2014/0012868 | A1 * | 1/2014 | Nakazaki | G06F 16/532 707/758 |
| 2016/0180473 | A1 * | 6/2016 | Groeneveld | A01C 21/00 705/7.25 |
| 2017/0127606 | A1 * | 5/2017 | Horton | A01B 69/001 |
| 2017/0164556 | A1 * | 6/2017 | Aharoni | G06Q 50/02 |
| 2017/0202162 | A1 * | 7/2017 | Dufresne | A01G 31/06 |
| 2019/0050948 | A1 * | 2/2019 | Perry | G06Q 50/02 |
| 2020/0134485 | A1 * | 4/2020 | Sood | G06N 5/01 |
| 2020/0253127 | A1 * | 8/2020 | McCall | G06Q 50/02 |
| 2022/0138649 | A1 * | 5/2022 | Ashtekar | A01B 69/001 705/7.36 |
| 2022/0138703 | A1 * | 5/2022 | Ashtekar | G06Q 50/02 705/308 |
| 2022/0138767 | A1 * | 5/2022 | Ashtekar | G06V 10/58 705/7.22 |
| 2022/0245383 | A1 * | 8/2022 | Kraus | G06T 7/11 |
| 2024/0135297 | A1 * | 4/2024 | Edmondson | G06Q 50/02 |

FOREIGN PATENT DOCUMENTS

| | | | | |
|---|---|---|---|---|
| CN | 108934842 | A | 12/2018 | |
| CN | 111008941 | A | 4/2020 | |
| CN | 115520291 | A | 12/2022 | |
| CN | 115535006 | A | 12/2022 | |
| CN | 115571168 | A | 1/2023 | |
| EP | 4435683 | A1 * | 9/2024 | G06Q 10/0637 |
| WO | WO-2023283740 | A1 * | 1/2023 | G06Q 50/02 |

OTHER PUBLICATIONS

Yan, Ming, et al. "A comparative study on carbon footprint of rice production between household and aggregated farms from Jiangxi , China." Environmental Monitoring and Assessment 187 (2015): 1-13. (Year: 2015).*

Agnoletti, Mauro, et al. "Terraced landscapes and hydrogeological risk. Effects of land abandonment in Cinque Terre (Italy) during severe rainfall events." Sustainability 11.1 (2019): 235. (Year: 2019).*

Sunguroğlu Hensel, Defne. "Ecological prototypes: Initiating design innovation in green construction." Sustainability 12.14 (2020): 5865. (Year: 2020).*

Kana, Ala, and Imtiaz Ahmad. "An Effective Runge-Kutta Optimizer Based on Adaptive Population Size and Search Step Size." Computers, Materials & Continua 76.3 (2023). (Year: 2023).*

Sakakibara, et al., "A resource analysis on solar photovoltaic generation by a remote sensing approach," Conference Paper · Jun. 2003, Proceddings of the 3rd World Conference on Photovoltaic Energy Conversion—Osaka Duration: May 11, 2003 → May 18, 2003, DOI: 10.1109/WCPEC.2003.1305060.

Goodrich, "SALSA-MEX: a large scale Semi-Arid Land-Surface-Atmospheric Mountain Experiment," Proceedings of IGARSS '94—1994 IEEE International Geoscience and Remote Sensing Symposium, Aug. 8-12, 1994, DOI: 10.1109/IGARSS.1994.399077.

Benzo, et al., "Whole systems assessment of current and future wind speed and energy trends in rural Peru," 2020 IEEE Global Humanitarian Technology Conference (GHTC), Date of Conference: Oct. 29, 2020-Nov. 1, 2020, DOI: 10.1109/GHTC46280.2020.9342931.

Pande, et al., "Energy efficient hybrid architecture and positioning of sensors in WSN for precision agriculture," CUBE '12: Proceedings of the CUBE International Information Technology Conference, Sep. 2012, Published: Sep. 3, 2012, pp. 198-203, https://doi.org/10.1145/2381716.2381754.

Zehao, et al., "Reconstruction and Response of Tree-ring Width Chronology at Various Altitudes to Climate Change on Taibai Mountain," IEEA '17: Proceedings of the 6th International Conference on Informatics, Environment, Energy and Applications, Jeju Republic of Korea Mar. 29-31, 2017, pp. 60-66, https://doi.org/10.1145/3070617.3070635.

Zhang, et al., "Research and Application of Agriculture Knowledge Graph," EITCE '21: Proceedings of the 2021 5th International Conference on Electronic Information Technology and Computer Engineering, Xiamen China Oct. 22-24, 2021, pp. 680-688, https://doi.org/10.1145/3501409.3501531.

Euromontana, "Agriculture and rural development," Webpage Retrieved from the Internet: May 24, 2023, https://www.euromontana.org/en/working-themes/agriculture-and-rural-development/.

Cunha, "The Future of Mountain Agriculture," May 1, 2015, https://bioone.org/journals/mountain-research-and-development/volume-35/issue-2/mrd.mm158/the-future-of-mountain-agriculture/10.1659/mrd.mm158.full.

Sourcerace, "An Uphill Task: Producing Food in the Mountains," Webpage Retrieved from the Internet: May 24, 2023, https://www.sourcetrace.com/blog/uphill-task-producing-food-mountains.

IBM, "From bean to the brew on the blockchain," Webpage Retrieved from the Internet: May 24, 2023, https://www.ibm.com/thought-leadership/coffee/.

IBM, "IBM Supply Chain Intelligence Suite: Food Trust," Webpage Retrieved from the Internet: May 24, 2023, https://www.ibm.com/blockchain/solutions/food-trust.

* cited by examiner

Figure 4:
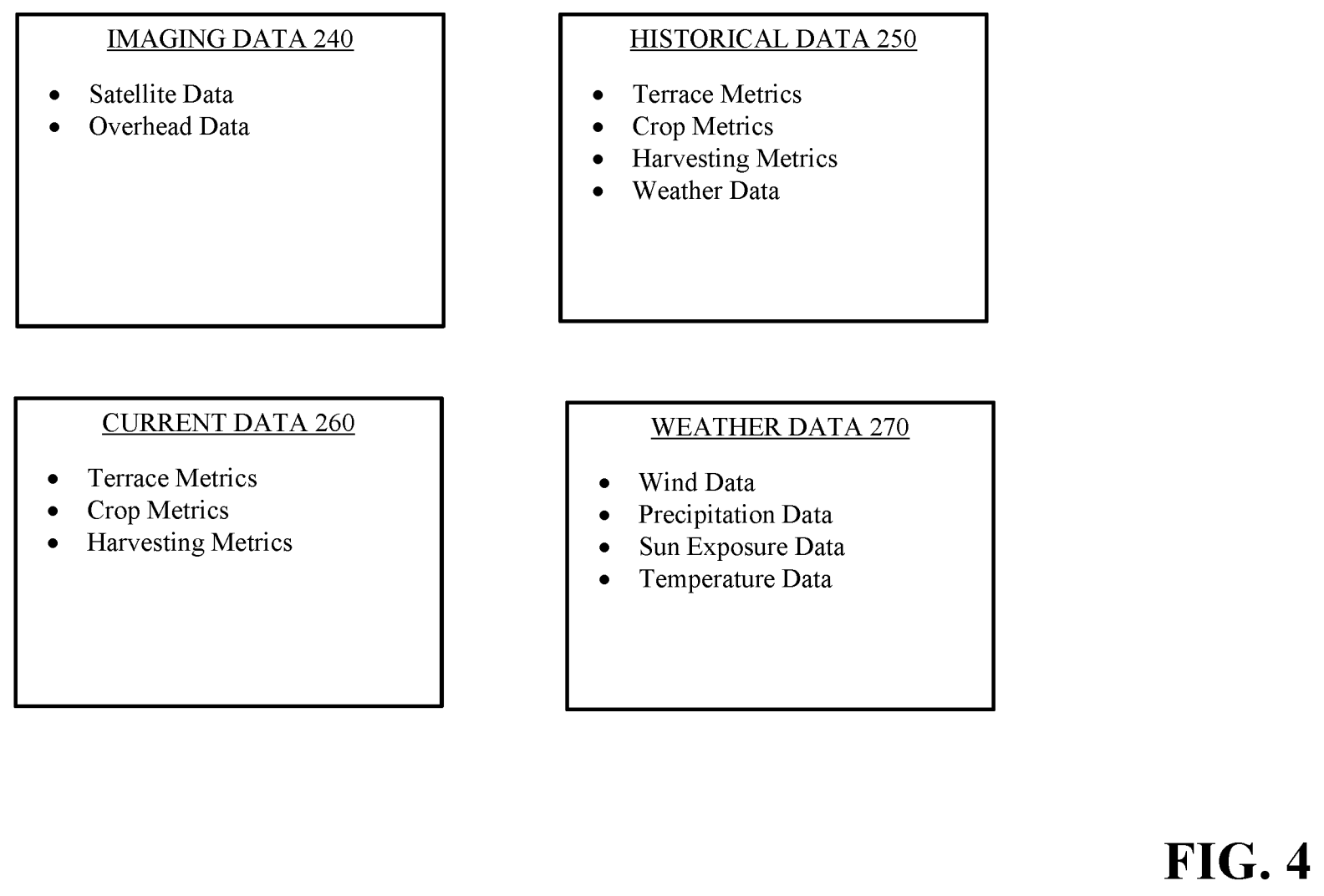

IMAGING DATA 240

- Satellite Data
- Overhead Data

HISTORICAL DATA 250

- Terrace Metrics
- Crop Metrics
- Harvesting Metrics
- Weather Data

CURRENT DATA 260

- Terrace Metrics
- Crop Metrics
- Harvesting Metrics

WEATHER DATA 270

- Wind Data
- Precipitation Data
- Sun Exposure Data
- Temperature Data

Figure 5:
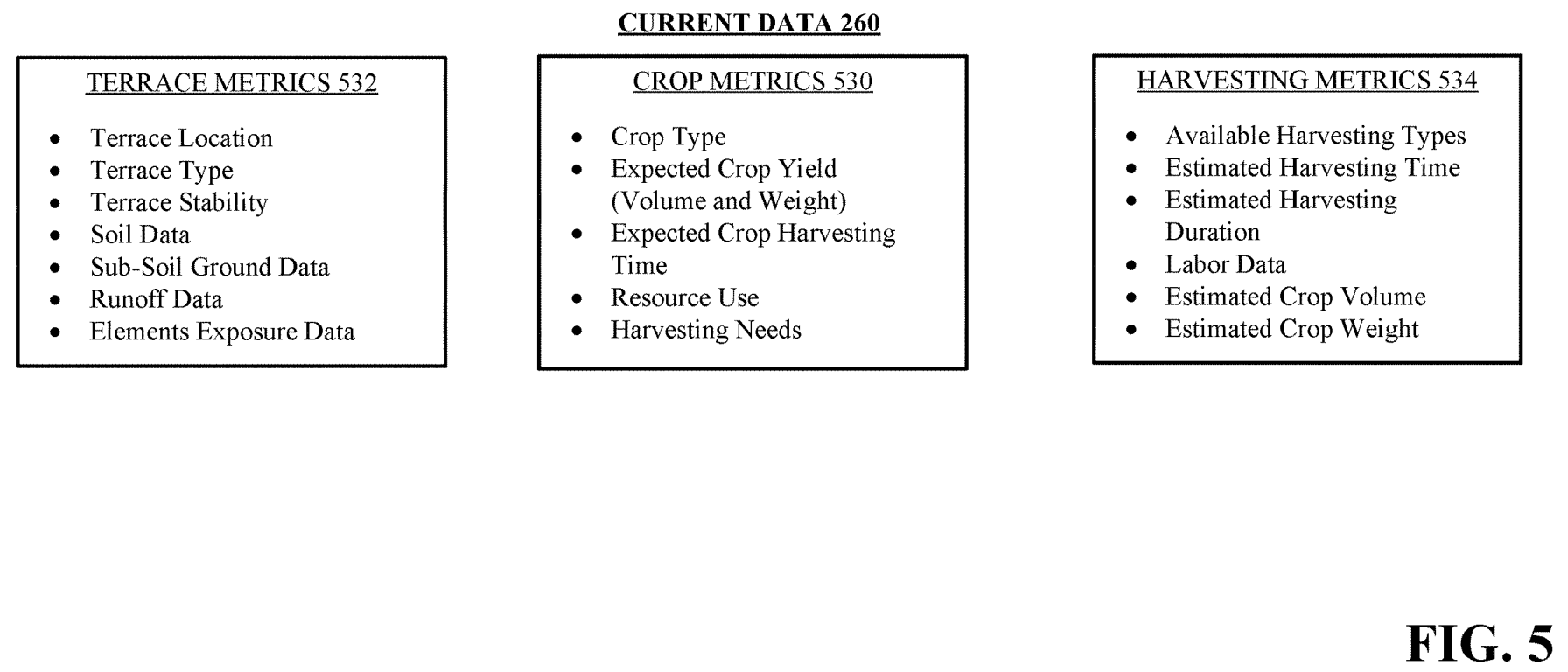

CURRENT DATA 260

HARVESTING METRICS 534

- Available Harvesting Types
- Estimated Harvesting Time
- Estimated Harvesting Duration
- Labor Data
- Estimated Crop Volume
- Estimated Crop Weight

CROP METRICS 530

- Crop Type
- Expected Crop Yield (Volume and Weight)
- Expected Crop Harvesting Time
- Resource Use
- Harvesting Needs

TERRACE METRICS 532

- Terrace Location
- Terrace Type
- Terrace Stability
- Soil Data
- Sub-Soil Ground Data
- Runoff Data
- Elements Exposure Data

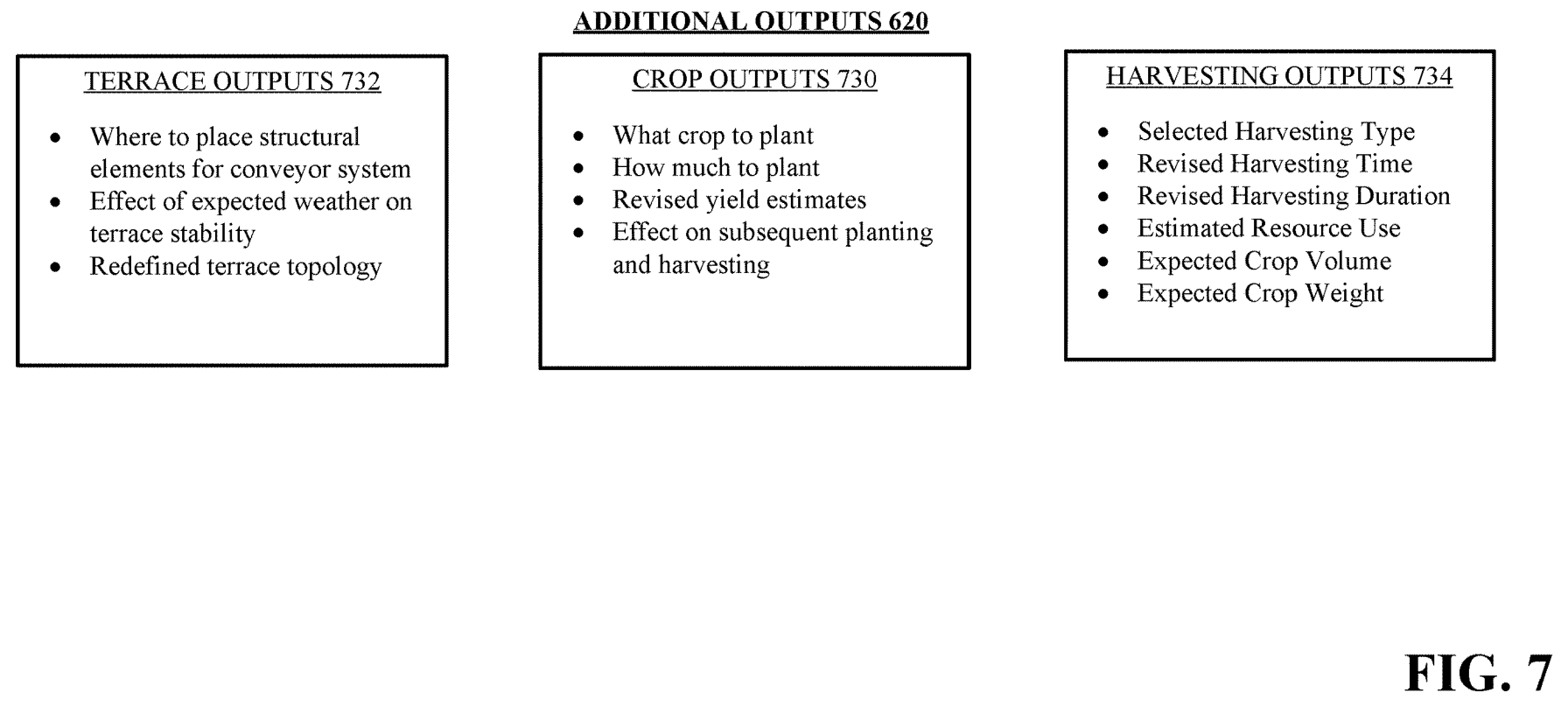

ADDITIONAL OUTPUTS 620

HARVESTING OUTPUTS 734

- Selected Harvesting Type
- Revised Harvesting Time
- Revised Harvesting Duration
- Estimated Resource Use
- Expected Crop Volume
- Expected Crop Weight

CROP OUTPUTS 730

- What crop to plant
- How much to plant
- Revised yield estimates
- Effect on subsequent planting and harvesting

TERRACE OUTPUTS 732

- Where to place structural elements for conveyor system
- Effect of expected weather on terrace stability
- Redefined terrace topology

FIG. 7

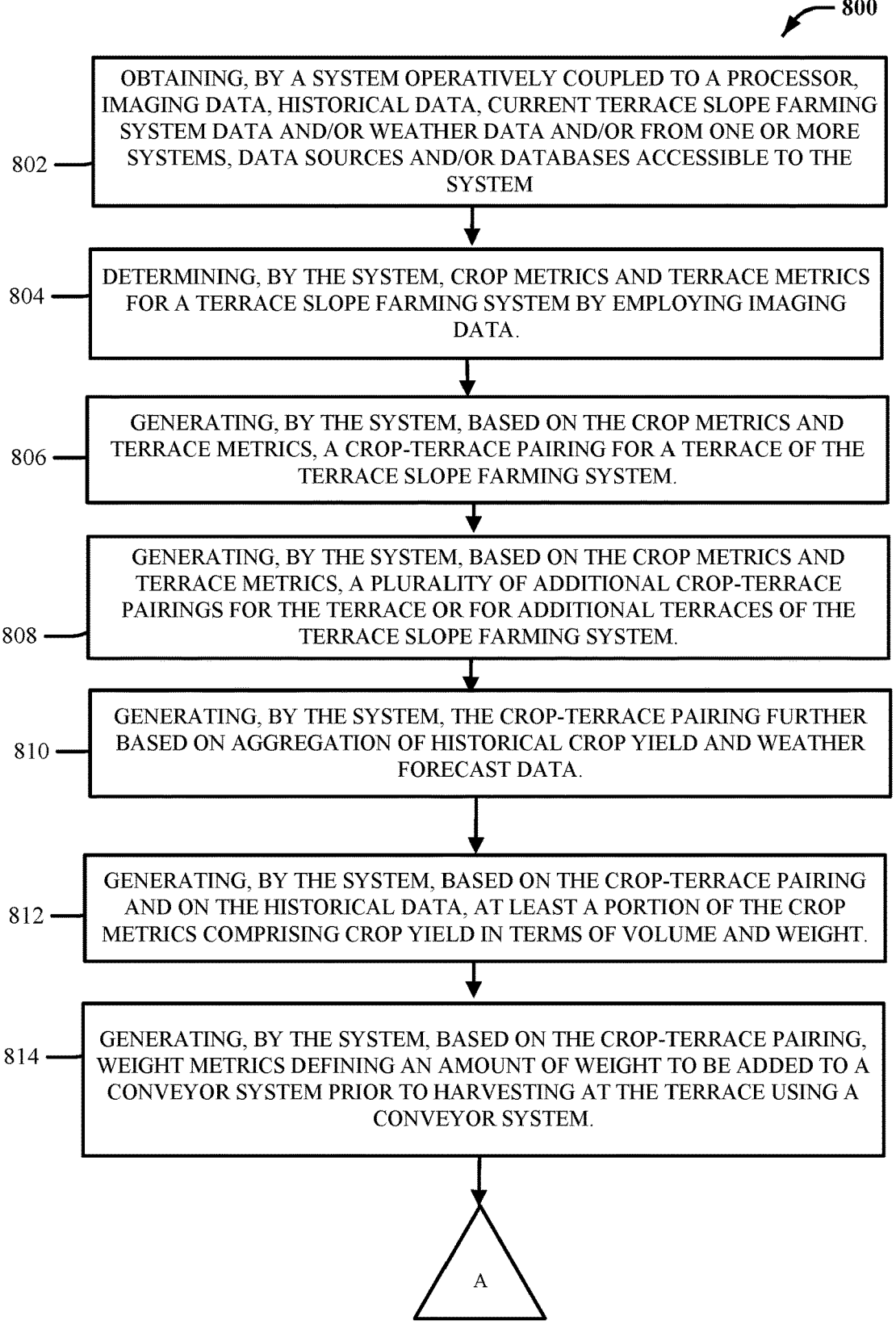

800

802 — OBTAINING, BY A SYSTEM OPERATIVELY COUPLED TO A PROCESSOR, IMAGING DATA, HISTORICAL DATA, CURRENT TERRACE SLOPE FARMING SYSTEM DATA AND/OR WEATHER DATA AND/OR FROM ONE OR MORE SYSTEMS, DATA SOURCES AND/OR DATABASES ACCESSIBLE TO THE SYSTEM

804 — DETERMINING, BY THE SYSTEM, CROP METRICS AND TERRACE METRICS FOR A TERRACE SLOPE FARMING SYSTEM BY EMPLOYING IMAGING DATA.

806 — GENERATING, BY THE SYSTEM, BASED ON THE CROP METRICS AND TERRACE METRICS, A CROP-TERRACE PAIRING FOR A TERRACE OF THE TERRACE SLOPE FARMING SYSTEM.

808 — GENERATING, BY THE SYSTEM, BASED ON THE CROP METRICS AND TERRACE METRICS, A PLURALITY OF ADDITIONAL CROP-TERRACE PAIRINGS FOR THE TERRACE OR FOR ADDITIONAL TERRACES OF THE TERRACE SLOPE FARMING SYSTEM.

810 — GENERATING, BY THE SYSTEM, THE CROP-TERRACE PAIRING FURTHER BASED ON AGGREGATION OF HISTORICAL CROP YIELD AND WEATHER FORECAST DATA.

812 — GENERATING, BY THE SYSTEM, BASED ON THE CROP-TERRACE PAIRING AND ON THE HISTORICAL DATA, AT LEAST A PORTION OF THE CROP METRICS COMPRISING CROP YIELD IN TERMS OF VOLUME AND WEIGHT.

814 — GENERATING, BY THE SYSTEM, BASED ON THE CROP-TERRACE PAIRING, WEIGHT METRICS DEFINING AN AMOUNT OF WEIGHT TO BE ADDED TO A CONVEYOR SYSTEM PRIOR TO HARVESTING AT THE TERRACE USING A CONVEYOR SYSTEM.

METHOD TO CULTIVATE GREEN ENERGY PRACTICES AND PREDICT RISK FROM TERRACE-BASED AGRICULTURE

TECHNICAL FIELD

The present disclosure relates to prediction of environmental risk due to mountain agriculture, and more specifically to employing a framework for balancing that risk with green energy practices to reduce a carbon footprint of the mountain agriculture.

BACKGROUND

In agriculture, a terrace is a piece of sloped plane that has been cut into a series of successively receding flat surfaces or platforms, which resemble steps, for the purposes of more effective farming. This type of landscaping is therefore called terracing. Graduated terrace steps are commonly used to farm on hilly or mountainous terrain. Terraced fields decrease both erosion and surface runoff and may be used to support growing crops that require irrigation, such as rice.

Terrace farming maximizes the use of available land and reduces erosion and water loss. It requires large amounts of resource and distribution centers at the top of the terrace. Water, seeds, equipment, distribution and harvesting often occur at the peak of the mountain to optimize gravity.

SUMMARY

The following presents a summary to provide a basic understanding of one or more embodiments described herein. This summary is not intended to identify key or critical elements, and/or to delineate scope of particular embodiments or scope of claims. Its sole purpose is to present concepts in a simplified form as a prelude to the more detailed description that is presented later. In one or more embodiments, systems, computer-implemented methods, apparatuses and/or computer program products described herein can provide a process to employ artificial intelligence, such as machine learning, to provide predictive estimation of a plurality of environmental agriculture outputs based on an extensive set of input factors, allowing for balancing of these factors based on an artificial intelligence model and historical data upon which the artificial intelligence model is trained.

In accordance with an embodiment, a system can comprise a memory that stores computer executable components and a processor that executes the computer executable components stored in the memory. The computer executable components comprise an analysis component that determines crop metrics and terrace metrics for a terrace slope farming system by employing imaging data, a prediction component that generates, based on the crop metrics and terrace metrics, a crop-terrace pairing for a terrace of the terrace slope farming system, wherein the crop-terrace pairing is defined by one or more of the crop metrics that match to one or more of the terrace metrics, and an evaluation component that identifies the crop-terrace pairing as resulting in a first carbon footprint that is lower than a second carbon footprint that is identified by the evaluation component for the same terrace.

In accordance with another embodiment, a computer-implemented method can comprise determining, by a system operatively coupled to at least one processor, crop metrics and terrace metrics for a terrace slope farming system by employing imaging data; generating, by the system, based on the crop metrics and terrace metrics, a crop-terrace pairing for a terrace of the terrace slope farming system, wherein the crop-terrace pairing is defined by one or more of the crop metrics that match to one or more of the terrace metrics; and identifying, by the system, the crop-terrace pairing as resulting in a first carbon footprint that is lesser than a second carbon footprint that is identified for the same terrace.

In accordance with still another embodiment, a computer program product, facilitating a process for promoting green energy practices for terrace slope farming, can comprise a computer readable storage medium having program instructions embodied therewith, the program instructions executable by a processor to cause the processor to determine, by the processor, crop metrics and terrace metrics for a terrace slope farming system by employing imaging data; generate, by the processor, based on the crop metrics and terrace metrics, a crop-terrace pairing for a terrace of the terrace slope farming system, wherein the crop-terrace pairing is defined by one or more of the crop metrics that match to one or more of the terrace metrics; and identify, by the processor, the crop-terrace pairing as resulting in a first carbon footprint that is lesser than a second carbon footprint that is identified for the same terrace.

An advantage of the above-indicated system, computer-implemented method and/or computer program product can be use of both terrace information and crop information to define a profile that can be used to minimize an environmental effect on the terrace slope farming system. In this way, less power can be wasted, additional power can be stored as potential energy, greater amount of passive energy such as gravity can be employed, use of uneven terrain can be increased, and/or larger harvest yields can be obtained. As a result, environmentally, water can be retained, soil erosion and runoff can be reduced, and/or a smaller carbon footprint can be employed. This data and results can be useful in the fields of terrace slope farming where such farming can be important to sustainability and economical growth of a region.

Another advantage of the above-indicated system, computer-implemented method and/or computer program product can be an ability to train an analytical model, such as a machine learning model based on a large amount of input data categories and on a large amount of data within each category for use in making one or more predictions related to the terrace slope farming system. Indeed such quantity of information cannot be processed quickly and efficiently, and aggregated into a plurality of crop-terrace pairings by the machine learning model. That is, an administrator entity using the system, method and/or computer program product detailed herein can aggregate data and facilitate prediction of a plurality of types of results (e.g., crop-terrace pairings, carbon footprint per terrace, where to place structural elements for a conveyor system, effect of expected weather on terrace stability, redefined terrace topology, what crop to plant, how much to plant, revised yield estimates, effect on subsequent seasons of planting and harvesting, selected harvesting type, revised harvesting timeline, revised harvesting duration, estimated resource use, and/or expected crop volume and weight). Furthermore, these results can be ranked and/or prioritized based on one or more selected metrics and/or thresholds.

DESCRIPTION OF THE DRAWINGS

FIG. 4 illustrates a plurality of sets of input information that can be employed by the non-limiting system of FIG. 2, in accordance with one or more embodiments described herein.

FIG. 5 illustrates a plurality of categories of input information that can be employed by the non-limiting system of FIG. 2, in accordance with one or more embodiments described herein.

FIG. 7 illustrates a plurality of sets of output information that can be predicted by the non-limiting system of FIG. 2, in accordance with one or more embodiments described herein.

FIG. 8 illustrates a flow diagram of one or more processes that can be performed by the non-limiting system of FIG. 2, in accordance with one or more embodiments described herein.

DETAILED DESCRIPTION

Figure 1:
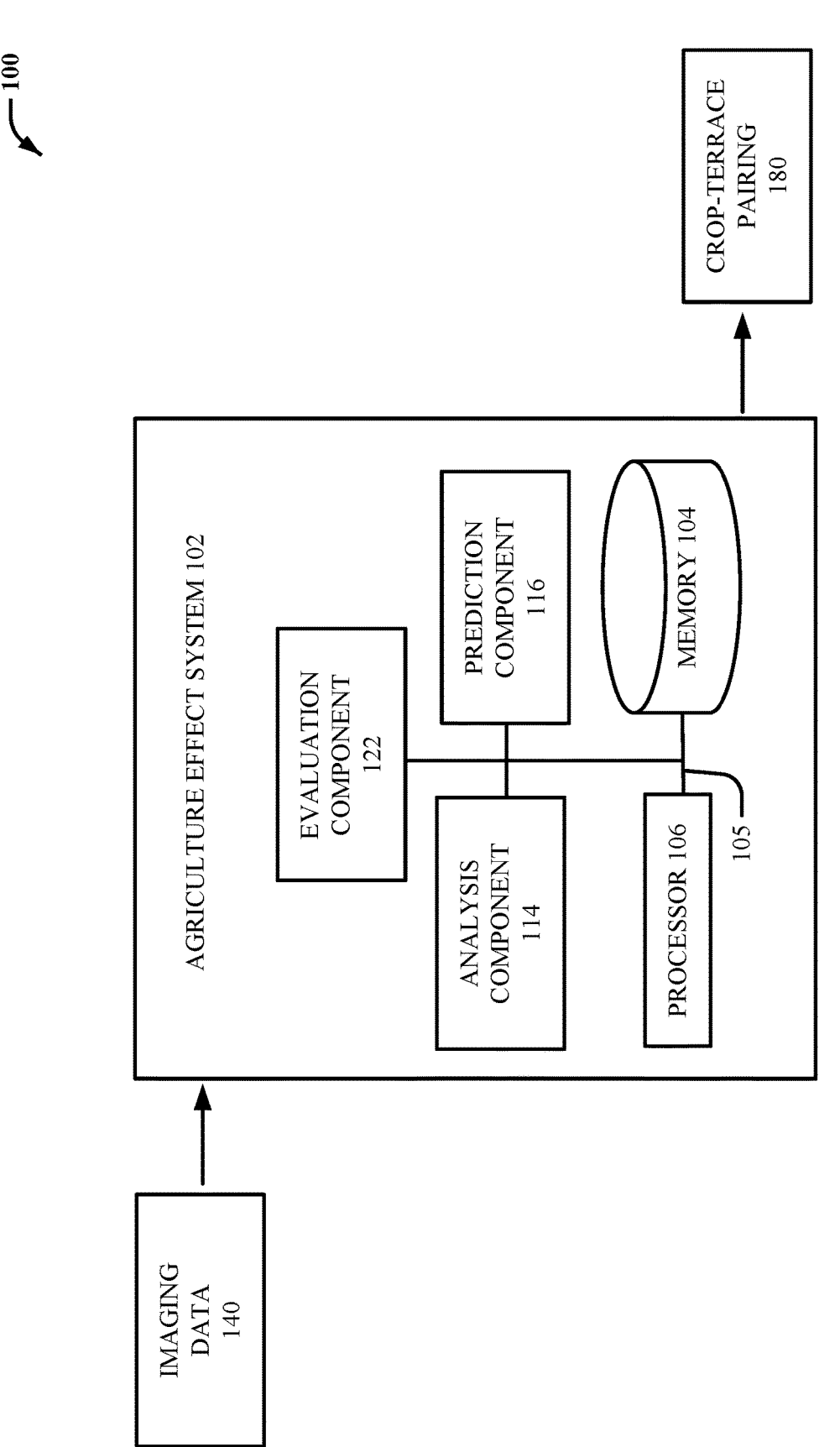
FIG. 1 illustrates a block diagram of an example, non-limiting system that can provide a process to employ artificial intelligence, such as machine learning, to provide predictive estimation of a plurality of environmental agriculture outputs based on an extensive set of input factors, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Terrace slope farming maximizes the use of available land and reduces erosion and water loss. However, this type of farming also requires intensive resources and distribution centers at the top of the terraces. Water, seeds, equipment, distribution and/or harvesting can occur at the peak of the mountain to optimize gravity. However, the lifting and carrying of harvested crops is often not efficiently designed within the topology of a harvesting field. Potential energy of harvested crops is wasted on manual or power-driven movement of goods. Further, the distribution of materials that are required for moving crops up the terrace consume energy.

A secondary problem with terrace slope farming is land stability. When the land is overused or endures a lot of natural weather, the terraces can become unstable. The rate of change of the weather and harvesting affects the risk of each terrace's instability. To perform forecasting related to instability prediction, data is often used in existing data analytics processes. However, the data employed can be extensive and use is often limited to one or only a few categories for prediction of a single output prediction related to a single terrace at a time.

To account for one or more of these deficiencies of existing frameworks (e.g., agricultural data analytics processes), one or more embodiments are described herein that can employ an analytical model, such as a machine learning model, which can access and process an extensive quantity of information from various sources and in various categories to output a plurality of different types of prediction outputs related to agricultural stability, environmental protection and resource use, all related to terrace slope farming.

Agriculturally and environmentally, the predictions can enable cultivation and storage of a portion of harvested crop potential energy while using a remainder to raise materials up the terrace slope farming system. As just one example, when crops are not ready for harvesting, collection containers are placed on a conveyor line and catch water and to use wind. The potential energy of water adds weight to container while wind adds force to move the container down the terrace. The cultivation of energy can be used on the power grid.

Put another way, the one or more embodiments described herein can provide for estimation of crop-terrace pairings, terrace topology, harvesting timelines and/or harvesting type while aligning these estimations to agricultural and environmental stability.

As used herein, agricultural stability can refer to the stability of the land and the continued availability of the land for seasons in the future.

As used herein, environmental stability can refer to limiting erosion, runoff and terrace collapse, and further to limiting carbon footprint related to growth, harvesting and associated resource transfer for terrace slope farming.

As used herein, the term "data" can comprise metadata.

As used herein, the terms "entity," "requesting entity," and "user entity" can refer to a machine, device, component, hardware, software, smart device, party, organization, individual and/or human.

DESCRIPTION

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident in various cases, however, that the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein.

Figure 2:
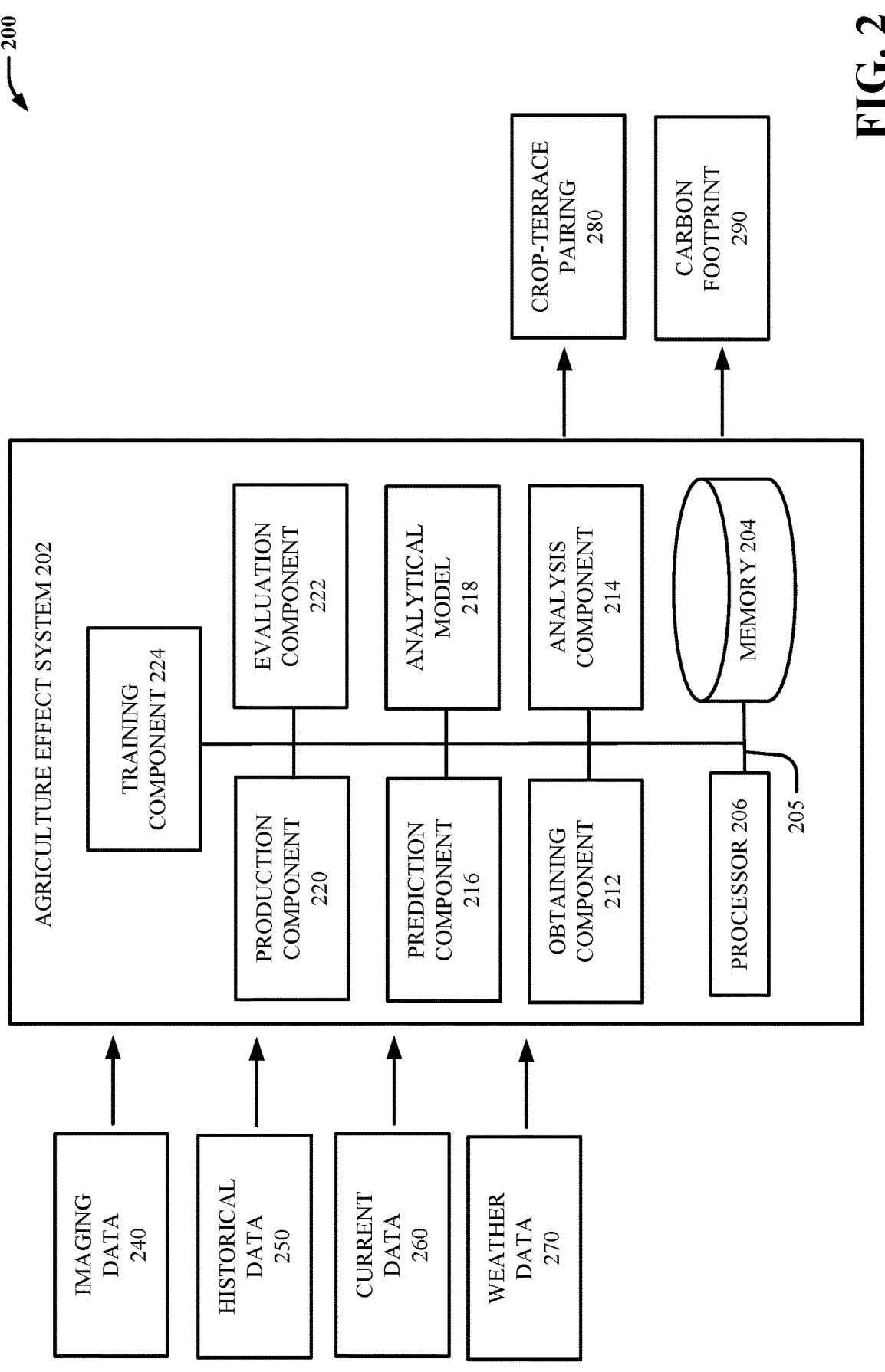
FIG. 2 illustrates a block diagram of another example, non-limiting system that can provide a process to employ artificial intelligence, such as machine learning, to provide predictive estimation of a plurality of environmental agriculture outputs based on an extensive set of input factors, in accordance with one or more embodiments described herein.
Figure 10:
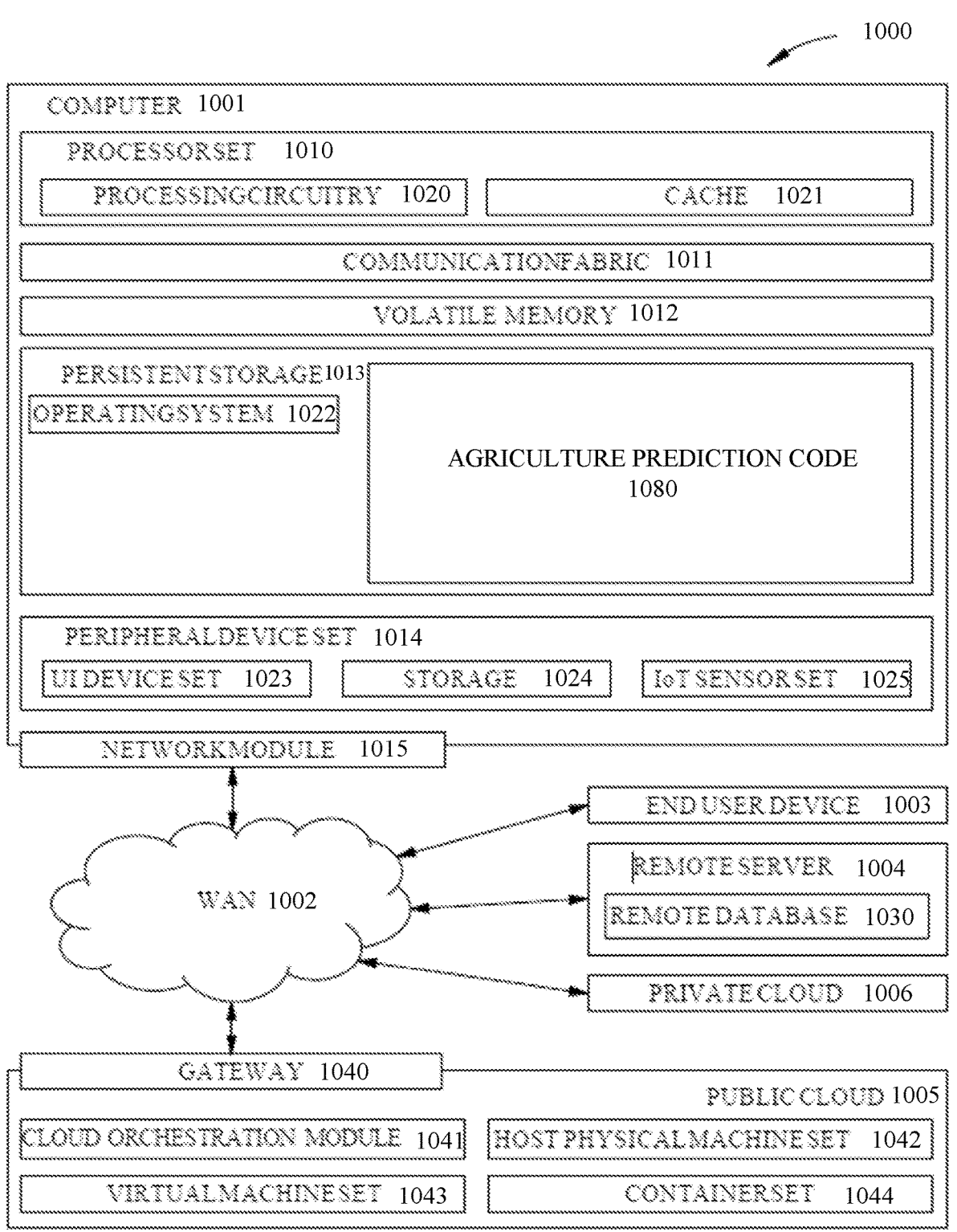
FIG. 10 illustrates a block diagram of example, non-limiting, computer environment in accordance with one or more embodiments described herein.

For example, in one or more embodiments, the non-limiting systems 100 and/or 200 illustrated at FIGS. 1 and 2, and/or systems thereof, can further comprise one or more computer and/or computing-based elements described herein with reference to a computing environment, such as the computing environment 1000 illustrated at FIG. 10. In one or more described embodiments, computer and/or computing-based elements can be used in connection with implementing one or more of the systems, devices, components and/or computer-implemented operations shown and/or described in connection with FIGS. 1 and/or 2 and/or with other figures described herein.

Turning now in particular to one or more figures, and first to FIG. 1, the figure illustrates a block diagram of an example, non-limiting system 100 that can facilitate a process to provide predictive estimation of a plurality of environmental agriculture outputs based on an extensive set of input factors, where the estimation is executed by an agriculture effect system 102.

It is noted that the agriculture effect system 102 is only briefly detailed to provide but a lead-in to a more complex and/or more expansive agriculture effect system 202 as illustrated at FIG. 2. That is, further detail regarding processes that can be performed by one or more embodiments described herein will be provided below relative to the non-limiting system 200 of FIG. 2.

Still referring to FIG. 1, the agriculture effect system 102 can comprise at least a memory 104, bus 105, processor 106, analysis component 114, prediction component 116 and evaluation component 122. Using these components, the agriculture effect system 102 can employ imaging data 140 to output at least a crop-terrace pairing 180 that is defined by a set (e.g., one or more) of terrace metrics matched to a set (e.g., one or more) of crop metrics. As used herein, the imaging data 140 can refer to any suitable imaging data such as satellite imaging data, drone, balloon or other air device imaging data, camera imaging data and/or the like. The crop-terrace pairing 180 can be used to match a crop growth and harvest to a terrace to allow for maximized agricultural and environmental stability of the terrace, and of the terrace slope farming system comprising the terrace as but one of a plurality of terraces.

The analysis component 114 can generally determine crop metrics and terrace metrics for a terrace slope farming system by employing imaging data. Crop metrics can comprise any information that defines the crop to be suggested as being planted and harvested at a particular harvest. Terrace metrics can comprise any information that defines the terrace at which the crop is suggested to be planted and harvested.

The prediction component 116 generally can generate, based on the based on the crop metrics and terrace metrics and on the imaging data 140, a crop-terrace pairing 180 for a terrace of the terrace slope farming system, where the crop-terrace pairing is defined by one or more of the crop metrics that match to one or more of the terrace metrics.

The evaluation component 122 generally can identify the crop-terrace pairing 180 as resulting in a first carbon footprint that is lesser than a second carbon footprint that is identified by the evaluation component 122 for the same terrace. As used herein, a carbon footprint can be defined in a quantity of carbon that is released into the environment due to resources (e.g., labor, machines, device) employed for planting, harvesting and resource distribution.

The analysis component 114, prediction component 116 and evaluation component 122 can be operatively coupled to a processor 106 which can be operatively coupled to a memory 104. The bus 105 can provide for the operative coupling. The processor 106 can facilitate execution of the analysis component 114, prediction component 116 and evaluation component 122. The analysis component 114, prediction component 116 and evaluation component 122 can be stored at the memory 104.

In general, the non-limiting system 100 can employ any suitable method of communication (e.g., electronic, communicative, internet, infrared, fiber, etc.) to provide communication between the agriculture effect system 102, a source of the imaging data 140 and a device associated with a user entity that will use the crop-terrace pairing 180.

Turning next to FIG. 2, a non-limiting system 200 is illustrated that can comprise a agriculture effect system 202. Repetitive description of like elements and/or processes employed in respective embodiments is omitted for sake of brevity. Description relative to an embodiment of FIG. 1 can be applicable to an embodiment of FIG. 2. Likewise, description relative to an embodiment of FIG. 2 can be applicable to an embodiment of FIG. 1.

Generally, the agriculture effect system can provide a process to employ artificial intelligence, such as machine learning, to provide predictive estimation of a plurality of environmental agriculture outputs based on an extensive set of input factors, allowing for balancing of these factors based on an artificial intelligence model and historical data upon which the artificial intelligence model is trained.

One or more communications between one or more components of the non-limiting system 200 can be provided by wired and/or wireless means including, but not limited to, employing a cellular network, a wide area network (WAN) (e.g., the Internet), and/or a local area network (LAN). Suitable wired or wireless technologies for supporting the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an advanced and/or adaptive network technology (ANT), an ultra-wideband (UWB) standard protocol and/or other proprietary and/or non-proprietary communication protocols.

The agriculture effect system 202 can be associated with, such as accessible via, a cloud computing environment.

The agriculture effect system 202 can comprise a plurality of components. The components can comprise a memory 204, processor 206, bus 205, obtaining component 212, analysis component 214, prediction component 216, analytical model 218, production component 220, evaluation component 222 and training component 224. Using these components, the agriculture effect system 202 can output one or more estimation outputs based on a plurality of input data, and in response to a query, where the estimation provides at least a single estimation in response to the query. The query can be requested by an entity, such as an administrator entity of a terrace slope farming system.

Figure 3:
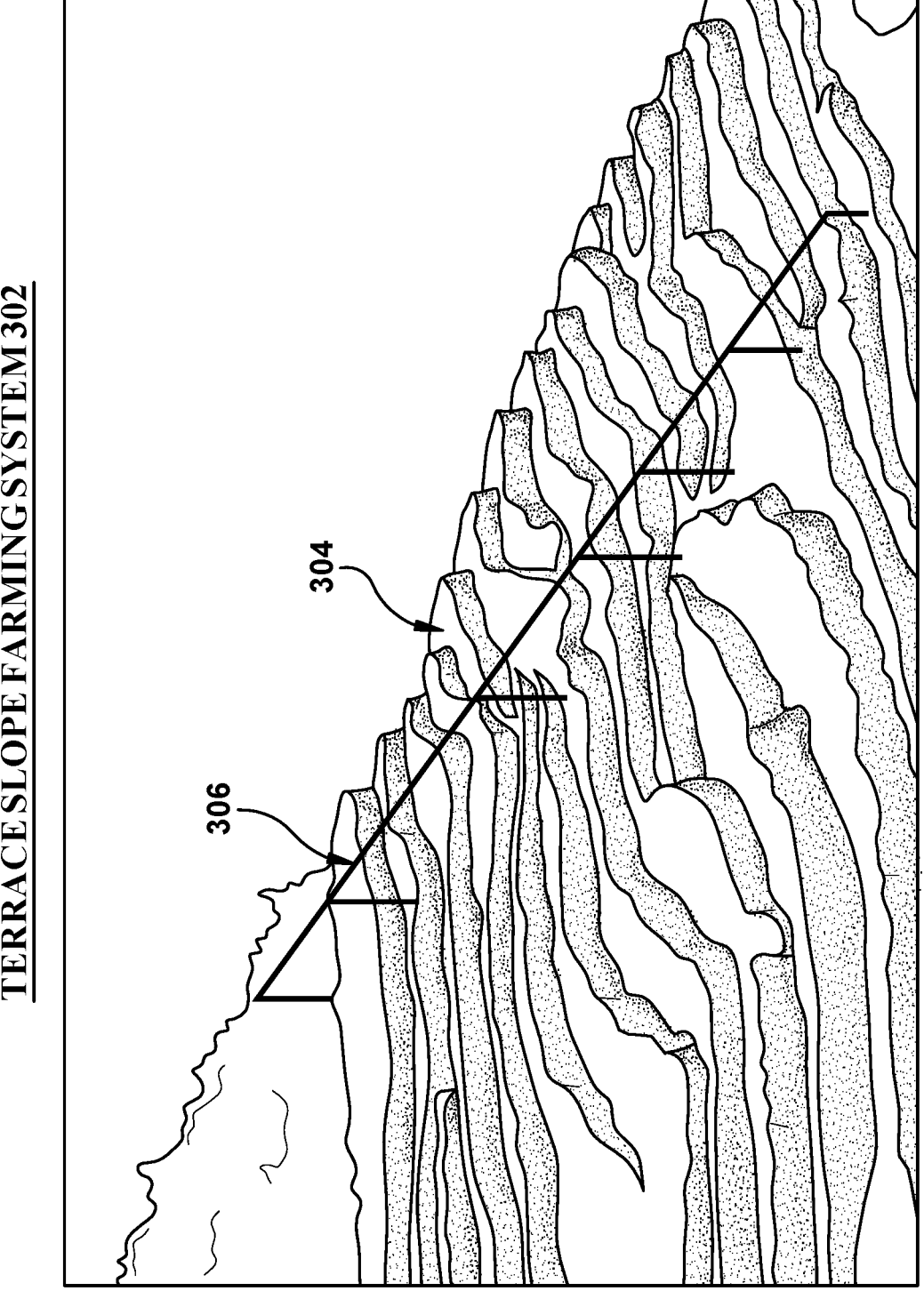
FIG. 3 provides an illustration of a terrace slope farming system for which one or more predictions can be made by the non-limiting system of FIG. 2, in accordance with one or more embodiments described herein.

Turning next briefly to FIG. 3, an exemplary terrace slope farming system 302 is illustrated. The terrace slope farming system 302 comprises a plurality of terraces 304 that are constructed from a slope, mountain, hill or other sloped terrain. Fixed structure can be employed at the terrain to support a conveyor system 306 that can serve to transport resources and harvested crops up and/or down the terrain. The resources can comprise seed, nutrients, water, soil, etc. The conveyor system 306 can comprise one or more buckets or other containers that can be moved along the conveyor system 306 to facilitate the transport. The buckets can be employed to catch precipitation water when not in use for transportation of resources or crops.

Discussion next turns back to FIG. 2 and briefly to the processor 206, memory 204 and bus 205 of the agriculture effect system 202. For example, in one or more embodiments, the agriculture effect system 202 can comprise the processor 206 (e.g., computer processing unit, microprocessor, classical processor, quantum processor and/or like processor). In one or more embodiments, a component associated with agriculture effect system 202, as described herein with or without reference to the one or more figures of the one or more embodiments, can comprise one or more computer and/or machine readable, writable and/or executable components and/or instructions that can be executed by processor 206 to provide performance of one or more processes defined by such component and/or instruction. In one or more embodiments, the processor 206 can comprise the obtaining component 212, analysis component 214, prediction component 216, analytical model 218, production component 220, evaluation component 222 and training component 224.

In one or more embodiments, the agriculture effect system 202 can comprise the computer-readable memory 204 that can be operably connected to the processor 206. The memory 204 can store computer-executable instructions that, upon execution by the processor 206, can cause the processor 206 and/or one or more other components of the agriculture effect system 202 (e.g., obtaining component 212, analysis component 214, prediction component 216, analytical model 218, production component 220, evaluation component 222 and training component 224) to perform one or more actions. In one or more embodiments, the memory 204 can store computer-executable components (e.g., obtaining component 212, analysis component 214, prediction component 216, analytical model 218, production component 220, evaluation component 222 and training component 224).

The agriculture effect system 202 and/or a component thereof as described herein, can be communicatively, electrically, operatively, optically and/or otherwise coupled to one another via a bus 205. Bus 205 can comprise one or more of a memory bus, memory controller, peripheral bus, external bus, local bus, quantum bus and/or another type of bus that can employ one or more bus architectures. One or more of these examples of bus 205 can be employed.

In one or more embodiments, the agriculture effect system 202 can be coupled (e.g., communicatively, electrically, operatively, optically and/or like function) to one or more external systems (e.g., a non-illustrated electrical output production system, one or more output targets and/or an output target controller), sources and/or devices (e.g., classical and/or quantum computing devices, communication devices and/or like devices), such as via a network. In one or more embodiments, one or more of the components of the agriculture effect system 202 and/or of the non-limiting system 200 can reside in the cloud, and/or can reside locally in a local computing environment (e.g., at a specified location).

In addition to the processor 206 and/or memory 204 described above, the agriculture effect system 202 can comprise one or more computer and/or machine readable, writable and/or executable components and/or instructions that, when executed by processor 206, can provide performance of one or more operations defined by such component and/or instruction.

Turning now to the additional components of the agriculture effect system 202 (e.g., obtaining component 212, analysis component 214, prediction component 216, analytical model 218, production component 220, evaluation component 222 and training component 224), generally, the agriculture effect system 202 can generate and/or train the analytical model 218, which can then be employed by the agriculture effect system 202 to output one or more estimations in response to a query. It is noted that while the analytical model 218 is illustrated as being comprised by the agriculture effect system 202, in one or more other embodiments, the analytical model 218 can be external to, but accessible by, the agriculture effect system 202.

Turning first to the obtaining component 210, the obtaining component 210 can generally identify, search, receive, transfer and/or otherwise obtain input data from one or more databases, online resources, entities and/or information caches. The input information can comprise imaging data 240, historical data 250, current data 260 about the terrace slope farming system, and weather data 270. This input data can be made available to and/or transmitted to the other components of the agriculture effect system 202 (e.g., the analysis component 214, prediction component 216, analytical model 218, production component 220 and/or evaluation component 222.)

Turning briefly to FIG. 4 categories of the different types of input data 240, 250, 260, 270 are illustrated for reference, but without being limited thereto. Imaging data 240 can comprise any suitable imaging data such as satellite imaging data, drone, balloon or other air device imaging data, camera imaging data and/or the like. Historical data 250 can comprise data from past seasons of growth and harvesting, such as terrace metrics, crop metrics, harvesting metrics and/or weather data. Current data 260 can refer to current types of crops being grown and current terrace topology and conditions, e.g., any information relating to current state and season of the terrace slope farming system 302. Crop metrics can comprise any information that defines the crop to be suggested as being planted and harvested at a particular harvest. Terrace metrics can comprise any information that defines the terrace at which the crop is suggested to be planted and harvested. Harvesting metrics can comprise any information that defines the harvesting of crops at the terrace slope farming system 302. Finally, weather data 270 can refer to wind data, precipitation data, sun exposure data and/or temperature data.

Turning briefly next to FIG. 5, the different categories of current data 260 are defined. For example, the current data 260 can comprise categories of crop metrics 530, terrace metrics 532 and/or harvesting metrics 534.

The aforementioned different datas can be stored at any suitable location, memory, database, library, cache and/or other storage device that can be accessible to the terrace slope farming system 302. Crop metrics 530 can comprise data defining crop type, expected crop yield in terms of volume and/or weight, expected crop harvesting time (e.g., when during a year), expected resource use and/or expected harvesting needs. Terrace metrics 532 can be provided per terrace of a terrace slope farming system and can comprise data defining terrace location, terrace type, terrace stability, soil data, sub-soil ground data, runoff data and/or elements exposure data. Harvesting metrics 534 can comprise data defining available harvesting types, estimated harvesting time, estimated harvesting duration, labor data, estimated crop volume and/or estimated crop weight.

Description now turns back to FIG. 2 and to the analysis component 214. The analysis component 214 can generally determine crop metrics and terrace metrics for a terrace slope farming system by employing the imaging data 240 initially. Thereafter, the crop metrics and terrace metrics can be revised employing historical data 250, current data 260 and/or weather data 270. In one or more other embodiments, the various types of input data 240, 250, 260 and 270 can be employed in any order and/or at least partially at the same time as one another. As previously mentioned, crop metrics can comprise any information that defines the crop to be suggested as being planted and harvested at a particular harvest, and terrace metrics can comprise any information that defines the terrace at which the crop is suggested to be planted and harvested.

The resulting output crop metrics and terrace metrics, and the original input data 240, 250, 260 and 270 can be further aggregated and employed by the prediction component 116, which can employ the analytical model 218 to output one or more predictions. These predictions can comprise at least one or more crop-terrace pairings 280.

Turning briefly to FIG. 7, furthermore, where suitable, one or more additional outputs 620 that can be estimated and/or otherwise determined by the prediction component 216 employing the analytical model 218 can be categories of crop outputs 730, terrace outputs 732 and/or harvesting outputs 734. Crop outputs 730 can comprise what crop to plant, how much to plant, revised yield estimates and/or effect on subsequent planting and harvesting, such as defined in terms of percentages relative to the current season. It is noted that any of these crop outputs 730 can be included in the data defining the crop-terrace pairings 280. Terrace outputs 732 can comprise where to place structural elements for a conveyor system, effect of expected weather on terrace stability and/or redefined terrace topology. Harvesting outputs 734 can comprise selected harvesting type, revised harvesting time, revised harvesting duration, estimated resource use, expected crop volume and/or expected crop weight.

Further, in one or more embodiments, the analysis component 214 can employ the imaging data 240 to generate and/or revise a 3D model of the terrace slope farming system 302, which 3D model can be employed by the prediction component 216, analytical model 218 and/or production component 220.

Turning back now to FIG. 2 and to the prediction component 216, the prediction component 216 generally can generate, based on the crop metrics and terrace metrics and based on the data 240, 250, 260, and 270, a crop-terrace pairing 280 for a terrace of the terrace slope farming system, where the crop-terrace pairing is defined by one or more of the crop metrics that match to one or more of the terrace metrics.

In one or more embodiments, the prediction component 216 can generate a plurality of crop-terrace pairings 280 for a same terrace along with corresponding carbon footprints 290. This plurality of data can be further ranked and/or sorted, such as relative to data therein and/or one or more thresholds by the evaluation component 222, to be discussed below.

In one or more embodiments, the prediction component 216 can generate based on one or more crop-terrace pairings and on the historical data 250, at least a portion of the crop metrics comprising crop yield in terms of volume and weight. That is, not all crop metrics can be made available by the analysis component 214 in all cases.

In one or more embodiments, the prediction component 216 can generate, based on one or more crop-terrace pairings, weight metrics defining an amount of weight to be added to the conveyor system 306 prior to harvesting at the terrace using the conveyor system 306. In this way, by using the estimation, the conveyor system 306 can be better balanced for efficient and smoot transportation of resources and/or for generation of potential energy to be stored for later use by the terrace slope farming system 302.

For example, while loaded containers of the conveyor system 306 are sliding downwards due to inclination of a ropeway of the conveyor system 306, pulleys of the ropeway and wheels of the loaded containers will be rotating during sliding. This rotation can be employed to generate power, where at least a portion of such power can be stored as potential energy in a corresponding energy grid.

In one or more embodiments, the prediction component 216 can forecast one or more landslides or likelihood of one or more landslides. For example, a Runga-Kutta (RK4) method can be employed based on the weather data 270 and/or estimated harvesting output metrics 734 to output a first RK4 forecasting for a plurality of terrace types. A second RK4 forecasting can then be employed to group the terrace types into groups such as K1, K2, K3 and K4. A final forecasting of the RK4 method can be used to generate forecasted components by the prediction component 216, such as being input into an analytical model (e.g., the analytical model 218, such as a neural network or machine learning model) to predict the likelihood of one or more aspects, such as a landslide. A set of equations is illustrated below that can be employed for this process.

$$\frac{dy}{dt} = f(t, y), \, y(t_0) = y_0.$$

$$k_1 = f(t_n, y_n),$$

$$k_2 = f\left(t_n + \frac{h}{2}, \, y_n + h\frac{k_1}{2}\right),$$

$$k_3 = f\left(t_n + \frac{h}{2}, \, y_n + h\frac{k_2}{2}\right),$$

$$k_4 = f(t_n + h, \, y_n + hk_3).$$

To analyze, parse, evaluate and/or otherwise aggregate the extensive amount of data in a quick and efficient manner, the prediction component 216 can employ the analytical model 218.

Accordingly, discussion next turns to the analytical model 218 and to the training component 224.

The analytical model 218 can comprise and/or can be comprised by a classical model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, self-supervised, semi-supervised and/or unsupervised. For example, the analytical model 218 can be and/or can comprise an ML model. Any reference herein solely to a machine learning model can be replaced by any other suitable type of analytical model described herein.

Generally, the analytical model 218 can be trained, such as by the training component 224, on at least the historical data 250. That is, using the historical data 250, the training component 224 can train the analytical model 218 for use in executing one or more estimation processes, such as in response to a query requesting one or more crop-terrace pairings 280.

In one or more embodiments, further training and/or fine-tuning of the analytical model 218 can be executed by the training component 224 at any suitable frequency, such as on demand, upon identification of changes to the data 240, 250, 260, 270, upon identification of a new related database, and/or after an iteration of generation of a crop-terrace pairing 280 and/or corresponding carbon footprint 290. For example, an estimation and any data/metadata output therewith can be employed by the training component 224 as historical data on which to train the analytical model 218 for better recognizing trends, such as relative to one or more future iterations of querying and estimation.

Next, the production component 220 generally can generate, based on the at least one crop-terrace pairing predicted and/or output by the prediction component 116, one or more carbon footprints 290, including a first carbon footprint for a terrace of a first crop-terrace pairing, where the one or more carbon footprints correspond to harvesting output metrics 734 comprising varying combinations of harvesting type and harvesting time/duration. That is, based on the harvesting outputs 734 (e.g., harvesting output metrics 734), output from and/or made available by the prediction component 216, the production component 220 can balance harvesting type (e.g., conveyor, industrial machine, conveyor transport, vehicle transport, manual labor, etc.) with harvesting time (e.g., season) and harvesting duration (e.g., how long it will take to harvest). Based on these aspects, one or more carbon footprints 290 can be generated for a same crop-terrace pairing 280. The different carbon footprints 290 can each comprise a different combination of harvesting type and harvesting time/duration.

As used herein, a carbon footprint can be defined in a quantity of carbon that is released into the environment due to resources (e.g., labor, machines, device) employed for planting, harvesting and resource distribution.

Next, using the outputs of the prediction component 216 (e.g., the crop-terrace pairings 280) and of the production component 220 (e.g., the carbon footprints 290), the evaluation component 222 generally can identify a crop-terrace pairing 280 as resulting in a first carbon footprint 290 that is lesser than a second carbon footprint 290 that is identified by the evaluation component 222 for the same terrace.

In one or more embodiments, the evaluation component 222 can rank a subset of crop-terrace pairings 290 that correspond to a same terrace. This ranking can be performed by any suitable metric, such as by lowest carbon footprint 290 (e.g., that individually correspond to individual ones of the crop-terrace pairings 290), or by any other metric, such as any one or more of the additional outputs 620 at FIG. 7.

In one or more embodiments, with or without ranking, the evaluation component 222 can determine whether any one or more of the crop-terrace pairings 280 corresponding to a same terrace satisfy one or more thresholds, such as a threshold for carbon footprint quantity. As used here, satisfaction of a threshold can refer to meeting or exceeding. For example, a threshold can be for carbon footprint below a carbon quantity. As such, the evaluation component 222 can determine if any of the crop-terrace pairings 280 of a subset satisfy a carbon footprint threshold and can also identify which one crop-terrace pairing thus has a best (e.g., highest or lowest, such as lowest relative to carbon footprint, or highest relative to estimate crop yield the subsequent season) metric value.

Figure 6:
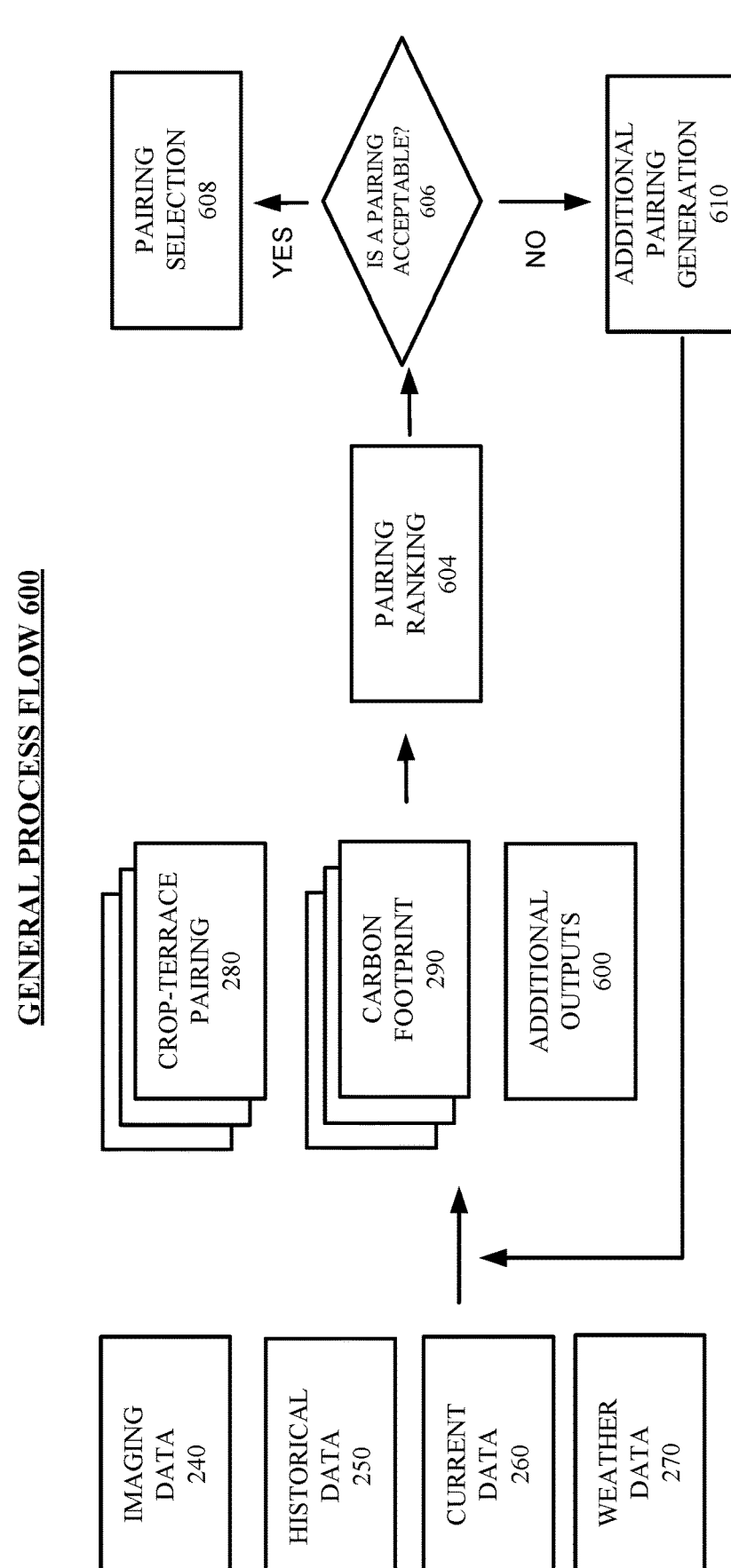
FIG. 6 illustrates a flow diagram of one or more processes that can be performed by the non-limiting system of FIG. 2, in accordance with one or more embodiments described herein.

As a summary of the one or more embodiments described above, discussion now turns to FIG. 6 and to a flow diagram 600 of example processes that can be performed by the agriculture effect system 202 of FIG. 2. As discussed above, the input data (e.g., imaging data 240, historical data 250, current data 260 and/or weather data 270) can be employed (e.g., by the analysis component 214 and prediction component 216) to output one or more crop-terrace pairings 280 and/or one or more additional outputs 600. Likewise, the input data can be employed (e.g., by the production component 220) to output one or more carbon footprints 290. The evaluation component 222 can perform pairing ranking 604 for a subset of crop-terrace pairings 280 corresponding to a same terrace. As noted above, the evaluation component 222 can determine whether any one or more of the crop-terrace pairings 280 corresponding to a same terrace satisfy one or more thresholds, such as a threshold for carbon footprint quantity (e.g., at decision step 606). Where the answer is yes, the evaluation component 222 can proceed to pairing selection 608 and can output, such as transmit, a selected crop-terrace pairing 280 to a device associated with a corresponding query and/or user entity. Where the answer is no, the process flow 600 can proceed back to additional pairing generation 610 and subsequent output of one or more crop-terrace pairings 280.

Figure 9:
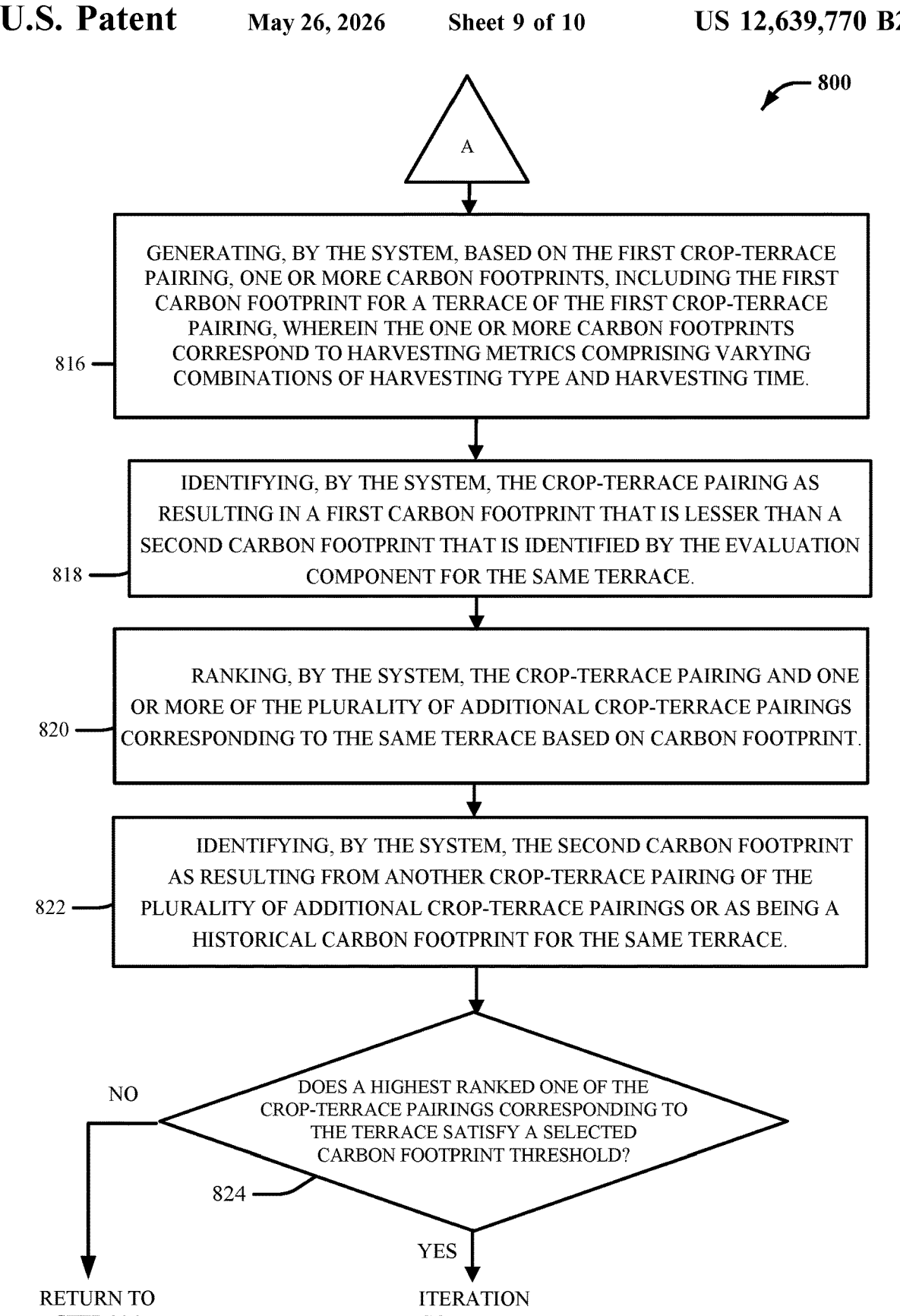
FIG. 9 illustrates a continuation of the flow diagram of FIG. 8 of one or more processes that can be performed by the non-limiting system of FIG. 2, in accordance with one or more embodiments described herein.

As another summary, referring next to FIGS. 8 and 9, illustrated is a flow diagram of an example, non-limiting method 1000 that can provide a process train a machine learning model and provide a process to employ artificial intelligence, such as machine learning, to provide predictive estimation of a plurality of environmental agriculture outputs based on an extensive set of input factors, allowing for balancing of these factors based on an artificial intelligence model and historical data upon which the artificial intelligence model is trained, in accordance with one or more embodiments described herein, such as the non-limiting system 200 of FIG. 2. While the non-limiting method 800 is described relative to the non-limiting system 200 of FIG. 2, the non-limiting method 800 can be applicable also to other systems described herein, such as the non-limiting system 100 of FIG. 1. Repetitive description of like elements and/or processes employed in respective embodiments is omitted for sake of brevity.

At 802, the non-limiting method 800 can comprise obtaining, by a system operatively coupled to a processor (e.g., obtaining component 212), imaging data (e.g., imaging data 240), historical data (e.g., historical data 250), current terrace slope farming system data (e.g., current data 260) and/or weather data (e.g., weather data 270) and/or from one or more systems, data sources and/or databases accessible to the system.

At 804, the non-limiting method 800 can comprise determining, by the system (e.g., analysis component 214), crop metrics and terrace metrics for a terrace slope farming system by employing imaging data.

At 806, the non-limiting method 800 can comprise generating, by the system (e.g., prediction component 216), based on the crop metrics and terrace metrics, a crop-terrace pairing (e.g., crop-terrace pairing 280) for a terrace of the terrace slope farming system (e.g., terrace slope farming system 302).

At 808, the non-limiting method 800 can comprise generating, by the system (e.g., prediction component 216), based on the crop metrics and terrace metrics, a plurality of additional crop-terrace pairings for the terrace or for additional terraces of the terrace slope farming system.

At 810, the non-limiting method 800 can comprise generating, by the system (e.g., prediction component 216), the crop-terrace pairing further based on aggregation of historical crop yield and weather forecast data.

At 812, the non-limiting method 800 can comprise generating, by the system (e.g., prediction component 216), based on the crop-terrace pairing and on the historical data, at least a portion of the crop metrics comprising crop yield in terms of volume and weight.

At 814, the non-limiting method 800 can comprise generating, by the system (e.g., prediction component 216), based on the crop-terrace pairing, weight metrics defining an amount of weight to be added to a conveyor system prior to harvesting at the terrace using a conveyor system.

At 816, the non-limiting method 800 can comprise generating, by the system (e.g., production component 220), based on the first crop-terrace pairing, one or more carbon footprints, including the first carbon footprint for a terrace of the first crop-terrace pairing, wherein the one or more carbon footprints correspond to harvesting metrics comprising varying combinations of harvesting type and harvesting time.

At 818, the non-limiting method 800 can comprise identifying, by the system (e.g., evaluation component 222), the crop-terrace pairing as resulting in a first carbon footprint (e.g., carbon footprint 290) that is lesser than a second carbon footprint that is identified by the evaluation component for the same terrace.

At 820, the non-limiting method 800 can comprise ranking, by the system (e.g., evaluation component 222), the crop-terrace pairing and one or more of the plurality of additional crop-terrace pairings corresponding to the same terrace based on carbon footprint.

At 822, the non-limiting method 800 can comprise identifying, by the system (e.g., evaluation component 222), the second carbon footprint as resulting from another crop-terrace pairing of the plurality of additional crop-terrace pairings or as being a historical carbon footprint for the same terrace.

At 824, the non-limiting method 800 can comprise determining, by the system (e.g., evaluation component 222), if a highest ranked one of the crop-terrace pairings corresponding to the terrace satisfies a selected carbon footprint threshold. If yes, the selected crop-terrace pairing can be employed for planning relative to the terrace. If no, the non-limiting method 800 can return to step 806.

Additional Summary

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture for transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more systems, computer program products and/or computer-implemented methods provided herein relate to balancing agriculture risk with green energy practices to reduce a carbon footprint. A system can comprise a memory that stores computer executable components and a processor that executes the computer executable components stored in the memory. The computer executable components comprise an analysis component that determines crop metrics and terrace metrics for a terrace slope farming system by employing imaging data, a prediction component that generates, based on the crop metrics and terrace metrics, a crop-terrace pairing for a terrace of the terrace slope farming system, wherein the crop-terrace pairing is defined by one or more of the crop metrics that match to one or more of the terrace metrics, and an evaluation component that identifies the crop-terrace pairing as resulting in a first carbon footprint that is lower than a second carbon footprint that is identified for the same terrace.

An advantage of the above-indicated system, computer-implemented method and/or computer program product can be use of both terrace information and crop information to define a profile that can be used to minimize an environmental effect on the terrace slope farming system. In this way, less power can be wasted, additional power can be stored as potential energy, greater amount of passive energy such as gravity can be employed, use of uneven terrain can be increased, and/or larger harvest yields can be obtained. As a result, environmentally, water can be retained, soil erosion and runoff can be reduced, and/or a smaller carbon footprint can be employed. This data and results can be useful in the fields of terrace slope farming where such farming can be important to sustainability and economical growth of a region.

Another advantage of the above-indicated system, computer-implemented method and/or computer program product can be an ability to train an analytical model, such as a machine learning model based on a large amount of input data categories and on a large amount of data within each category for use in making one or more predictions related to the terrace slope farming system. Indeed such quantity of information cannot be processed quickly and efficiently, and aggregated into a plurality of crop-terrace pairings by the machine learning model. That is, an administrator entity using the system, method and/or computer program product detailed herein can aggregate data and facilitate prediction of a plurality of types of results (e.g., crop-terrace pairings, carbon footprint per terrace, where to place structural elements for a conveyor system, effect of expected weather on terrace stability, redefined terrace topology, what crop to plant, how much to plant, revised yield estimates, effect on subsequent seasons of planting and harvesting, selected harvesting type, revised harvesting timeline, revised harvesting duration, estimated resource use, and/or expected crop volume and weight). Furthermore, these results can be ranked and/or prioritized based on one or more selected metrics and/or thresholds.

Indeed, in view of the one or more embodiments described herein, a practical application of the one or more systems, computer-implemented methods and/or computer program products described herein can be ability to quickly and efficiently process an extensive quantity of input information and to quickly and efficiently provide one or more predictions based on the input information using a machine learning model or other analytical model trained on relevant terrace slope farming system data. Further, such outputs can be employed for sustainability and environmental protection of the terrace slope farming system. Such is a useful and practical application of computers, thus providing enhanced (e.g., improved and/or optimized) data analysis and prediction output. Overall, such computerized tools can constitute a concrete and tangible technical improvement in the fields of agricultural sustainability, and more particularly in sustainability of terrace slope farming systems.

Furthermore, one or more embodiments described herein can be employed in a real-world system based on the disclosed teachings. For example, one or more embodiments described herein can function with a agricultural management system that can receive as input a query for a crop-terrace pairing, and which as an output can provide an output prediction while employing a machine learning model to quickly and efficiently process the data and provide the prediction.

Moreover, a device and/or method described herein can be implemented in one or more domains to enable scaled prediction output and/or model training. Indeed, use of a system as described herein can be scalable, such as where plural inputs databases (e.g., comprising data) can be evaluated, plural machine models models can be trained and/or plural estimations can be generated at least partially at a same time as one another. These processes can be performed for one or more terraces and/or one or more terrace slope farming systems at least partially at a same time as one another.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to agricultural estimation machine learning and inferencing, as compared to existing systems and/or techniques. Systems, computer-implemented methods and/or computer program products providing performance of these processes are of great utility in the fields of agricultural sustainability, and more particularly in sustainability of terrace slope farming systems, and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively automatically use machine training to quickly and efficiently process an extensive array of input data and output an extensive array of predictions by a machine learning model as the one or more embodiments described herein can provide this process. Moreover, neither can the human mind nor a human with pen and paper conduct one or more of these processes, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing one or more of the one or more operations described herein.

To provide additional summary, a listing of embodiments and features thereof is next provided.

A system, comprising: a memory that stores computer executable components; and a processor that executes the computer executable components stored in the memory, wherein the computer executable components comprise: an analysis component that determines crop metrics and terrace metrics for a terrace slope farming system by employing imaging data; a prediction component that generates, based on the crop metrics and terrace metrics, a crop-terrace pairing for a terrace of the terrace slope farming system, wherein the crop-terrace pairing is defined by one or more of the crop metrics that match to one or more of the terrace metrics; and an evaluation component that identifies the crop-terrace pairing as resulting in a first carbon footprint that is lesser than a second carbon footprint that is identified by the evaluation component for the same terrace.

The system of the preceding paragraph, wherein the second carbon footprint is identified by the evaluation component as resulting from another crop-terrace pairing generated by the prediction component or as being a historical carbon footprint.

The system of any preceding paragraph, wherein the generating by the prediction component is further based on aggregation of historical crop yield and weather forecast data.

The system of any preceding paragraph, wherein the prediction component further generates, based on the crop-terrace pairing and on the historical data, at least a portion of the crop metrics comprising crop yield in terms of volume and weight.

The system of any preceding paragraph, wherein the prediction component further generates, based on the crop-terrace pairing, weight metrics defining an amount of weight to be added to a conveyor system prior to harvesting at the terrace using a conveyor system.

The system of any preceding paragraph, wherein the computer executable components further comprise: a production component that generates, based on the first crop-terrace pairing, one or more carbon footprints, including the first carbon footprint for a terrace of the first crop-terrace pairing, wherein the one or more carbon footprints correspond to harvesting metrics comprising varying combinations of harvesting type and harvesting time.

The system of any preceding paragraph, wherein the terrace metrics comprise data corresponding to terrace type, terrace location and terrace stability defined relative to at least one terrace metric of an additional terrace of the terrace slope farming system.

A computer-implemented method, comprising: determining, by a system operatively coupled to at least one processor, crop metrics and terrace metrics for a terrace slope farming system by employing imaging data; generating, by the system, based on the crop metrics and terrace metrics, a crop-terrace pairing for a terrace of the terrace slope farming system, wherein the crop-terrace pairing is defined by one or more of the crop metrics that match to one or more of the terrace metrics; and identifying, by the system, the crop-terrace pairing as resulting in a first carbon footprint that is lesser than a second carbon footprint that is identified for the same terrace.

The computer-implemented method of the preceding paragraph, further comprising: identifying, by the system, the second carbon footprint as resulting from another crop-terrace pairing generated or as being a historical carbon footprint.

The computer-implemented method of any preceding paragraph, wherein the generating is further based on aggregation of historical crop yield and weather forecast data.

The computer-implemented method of any preceding paragraph, further comprising: generating, by the system, based on the crop-terrace pairing and on the historical data, at least a portion of the crop metrics comprising crop yield in terms of volume and weight.

The computer-implemented method of any preceding paragraph, further comprising: generating, by the system, based on the crop-terrace pairing, weight metrics defining an amount of weight to be added to a conveyor system prior to harvesting at the terrace using a conveyor system.

The computer-implemented method of any preceding paragraph, further comprising: generating, by the system, based on the first crop-terrace pairing, one or more carbon footprints, including the first carbon footprint, for a terrace of the first crop-terrace pairing, wherein the one or more carbon footprints correspond to harvesting metrics comprising varying combinations of harvesting type and harvesting time.

The computer-implemented method of any preceding paragraph, wherein the terrace metrics comprise data corresponding to terrace type, terrace location and terrace stability defined relative to at least one terrace metric of an additional terrace of the terrace slope farming system.

A computer program product facilitating a process for promoting green energy practices for terrace slope farming, the computer program product comprising a computer read-able storage medium having program instructions embodied therewith, the program instructions executable by a processor to cause the processor to: determine, by the processor, crop metrics and terrace metrics for a terrace slope farming system by employing imaging data; generate, by the processor, based on the crop metrics and terrace metrics, a crop-terrace pairing for a terrace of the terrace slope farming system, wherein the crop-terrace pairing is defined by one or more of the crop metrics that match to one or more of the terrace metrics; and identify, by the processor, the crop-terrace pairing as resulting in a first carbon footprint that is lesser than a second carbon footprint that is identified for the same terrace.

The computer program product of the preceding paragraph, wherein the program instructions are executable by the processor to further cause the processor to: identify, by the processor, the second carbon footprint as resulting from another crop-terrace pairing generated or as being a historical carbon footprint.

The computer program product of any preceding paragraph, wherein the generating is further based on aggregation of historical crop yield and weather forecast data.

The computer program product of any preceding paragraph, wherein the program instructions are executable by the processor to further cause the processor to: generate, by the processor, based on the crop-terrace pairing and on the historical data, at least a portion of the crop metrics comprising crop yield in terms of volume and weight.

The computer program product of any preceding paragraph, wherein the program instructions are executable by the processor to further cause the processor to: generate, by the processor, based on the crop-terrace pairing, weight metrics defining an amount of weight to be added to a conveyor system prior to harvesting at the terrace using a conveyor system.

The computer program product of any preceding paragraph, wherein the program instructions are executable by the processor to further cause the processor to: generate, by the processor, based on the first crop-terrace pairing, one or more carbon footprints, including the first carbon footprint, for a terrace of the first crop-terrace pairing, wherein the one or more carbon footprints correspond to harvesting metrics comprising varying combinations of harvesting type and harvesting time.

Computing Environment Description

Turning next to FIG. 10, a detailed description is provided of additional context for the one or more embodiments described herein at FIGS. 1-9.

FIG. 9 and the following discussion are intended to provide a brief, general description of a suitable computing environment 1000 in which one or more embodiments described herein at FIGS. 1-9 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as translation of an original source code based on a configuration of a target system by the agriculture prediction code 1080. In addition to block 1080, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1080, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1080 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid-state storage devices. Operating system 1022 may take several forms, such as various known proprietary operating systems or open-source Portable Operating System Interface type operating systems that employ a kernel. The code included in block 1080 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001) and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine that collects and stores helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

Additional Closing Information

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
a memory that stores computer executable components; and
a processor that executes at least one of the computer executable components that:
determines crop metrics and terrace metrics for a terrace slope farming system by employing imaging data of a land slope comprising the terrace slope farming system;
generates, based on the crop metrics and the terrace metrics, a crop-terrace pairing for a terrace of the terrace slope farming system, wherein the crop-terrace pairing is defined by one or more of the crop metrics that match to one or more of the terrace metrics, and wherein the crop-terrace pairing minimizes a carbon footprint of the terrace according to a defined criterion; and
generates, based on the crop-terrace pairing and prior to harvesting at the terrace using a conveyor system of the terrace slope farming system:
weight metrics defining respective amounts of weight to be added to bins on a downslope of the conveyor system, wherein the bins can be employed to catch precipitation water when not in use for transportation of resources or crops, and an output to an output target controller of an electrical output production system to cause the electrical output production system to:
add the bins to the downslope of the conveyor system to catch the precipitation water corresponding to the respective amounts of weight in the bins that produces, via gravitational motion of the bins down the land slope, a defined amount of electricity, wherein the gravitational motion of the bins of the conveyor system cause at least one of rotation of wheels of the bins or rotation of pulleys of a ropeway of the conveyor system to generate the defined amount of electricity, and
physically store the defined amount of electricity as potential energy in a corresponding energy grid associated with the terrace slope farming system.

2. The system of claim 1, wherein the crop-terrace pairing minimizes the carbon footprint for a defined harvesting type.

3. The system of claim 1, wherein the generating the crop-terrace pairing is further based on aggregation of historical crop yield and weather forecast data.

4. The system of claim 1, wherein the crop metrics comprise crop yield in terms of volume and weight.

5. The system of claim 1, wherein the crop-terrace pairing minimizes the carbon footprint for a defined crop yield.

6. The system of claim 1, wherein the at least one of the computer executable components further:
generates, based on the crop-terrace pairing, one or more carbon footprints that correspond to harvesting metrics comprising varying combinations of harvesting type and harvesting time.

7. The system of claim 1, wherein the terrace metrics comprise data corresponding to terrace type, terrace location and terrace stability defined relative to at least one terrace metric of an additional terrace of the terrace slope farming system.

8. A computer-implemented method, comprising:
determining, by a system operatively coupled to at least one processor, crop metrics and terrace metrics for a terrace slope farming system by employing imaging data of a land slope comprising the terrace slope farming system;
generating, by the system, based on the crop metrics and the terrace metrics, a crop-terrace pairing for a terrace of the terrace slope farming system, wherein the crop-terrace pairing is defined by one or more of the crop metrics that match to one or more of the terrace metrics, and wherein the crop-terrace pairing minimizes a carbon footprint of the terrace according to a defined criterion; and
generating, by the system, based on the crop-terrace pairing and prior to harvesting at the terrace using a conveyor system of the terrace slope farming system:
weight metrics defining respective amounts of weight to be added to bins on a downslope of the conveyor system, wherein the bins are employable to catch precipitation water when not in use for transportation of resources or crops, and
an output to an output target controller of an electrical output production system to cause the electrical output production system to:
add the bins to the downslope of the conveyor system to catch the precipitation water corresponding to the respective amounts of weight in the bins that produces, via gravitational motion of the bins down the land slope, a defined amount of electricity, wherein the gravitational motion of the bins of the conveyor system cause at least one of rotation of wheels of the bins or rotation of pulleys of a ropeway of the conveyor system to generate the defined amount of electricity, and physically store the defined amount of electricity as potential energy in a corresponding energy grid associated with the terrace slope farming system.

9. The computer-implemented method of claim 8, wherein the crop-terrace pairing minimizes the carbon footprint for a defined harvesting duration.

10. The computer-implemented method of claim 8, wherein the generating the crop-terrace pairing is further based on aggregation of historical crop yield and weather forecast data.

11. The computer-implemented method of claim 8, wherein the crop metrics comprise crop yield in terms of volume and weight.

12. The computer-implemented method of claim 8, wherein the crop-terrace pairing minimizes the carbon footprint for a defined crop yield.

13. The computer-implemented method of claim 12, further comprising:

generating, by the system, based on the crop-terrace pairing, one or more carbon footprints that correspond to harvesting metrics comprising varying combinations of harvesting type and harvesting time.

14. The computer-implemented method of claim 8, wherein the terrace metrics comprise data corresponding to terrace type, terrace location and terrace stability defined relative to at least one terrace metric of an additional terrace of the terrace slope farming system.

15. A computer program product facilitating a process for promoting green energy practices for terrace slope farming, the computer program product comprising a non-transitory computer readable medium having program instructions embodied therewith, the program instructions executable by a processor to cause the processor to:

determine, by the processor, crop metrics and terrace metrics for a terrace slope farming system by employing imaging data of a land slope comprising the terrace slope farming system;

generate, by the processor, based on the crop metrics and the terrace metrics, a crop- terrace pairing for a terrace of the terrace slope farming system, wherein the crop-terrace pairing is defined by one or more of the crop metrics that match to one or more of the terrace metrics, and wherein the crop-terrace pairing minimizes a carbon footprint of the terrace according to a defined criterion; and generate, by the processor, based on the crop-terrace pairing and prior to harvesting at the terrace using a conveyor system of the terrace slope farming system:

weight metrics defining respective amounts of weight to be added to bins on a downslope of the conveyor system, wherein the bins are employable to catch precipitation water when not in use for transportation of resources or crops, and an output to an output target controller of an electrical output production system to cause the electrical output production system to:

add the bins to the downslope of the conveyor system to catch the precipitation water corresponding to the respective amounts of weight the bins that produces, via gravitational motion of the bins down the land slope, a defined amount of electricity, wherein the gravitational motion of the bins of the conveyor system cause at least one of rotation of wheels of the bins or rotation of pulleys of a ropeway of the conveyor system to generate the defined amount of electricity, and physically store the defined amount of electricity as potential energy in a corresponding energy grid associated with the terrace slope farming system.

16. The computer program product of claim 15, wherein the crop-terrace pairing minimizes the carbon footprint for a defined harvesting type and harvesting duration.

17. The computer program product of claim 15, wherein the generating the crop-terrace pairing is further based on aggregation of historical crop yield and weather forecast data.

18. The computer program product of claim 15, wherein the crop metrics comprise crop yield in terms of volume and weight.

19. The computer program product of claim 15, wherein the crop-terrace pairing minimizes the carbon footprint for a defined crop yield.

20. The computer program product of claim 19, wherein the program instructions are executable by the processor to further cause the processor to:

generate, by the processor, based on the crop-terrace pairing, one or more carbon footprints that correspond to harvesting metrics comprising varying combinations of harvesting type and harvesting time.

* * * * *